(12) United States Patent
Anderson et al.

(10) Patent No.: US 9,872,423 B2
(45) Date of Patent: Jan. 23, 2018

(54) ADJUSTABLE PRESS WHEEL SCRAPER

(71) Applicant: CNH Industrial America LLC, New Holland, PA (US)

(72) Inventors: Brian J. Anderson, Yorkville, IL (US); Johnathon R. Dienst, DeKalb, IL (US); Ryan R. Raetzman, Lemont, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 142 days.

(21) Appl. No.: 14/754,811

(22) Filed: Jun. 30, 2015

(65) Prior Publication Data

US 2017/0000014 A1   Jan. 5, 2017

(51) Int. Cl.
*A01C 5/06* (2006.01)

(52) U.S. Cl.
CPC .................... *A01C 5/068* (2013.01)

(58) Field of Classification Search
CPC ....... A01C 5/068; A01L 323/06; A01B 15/16; A01B 71/08; A01B 23/06
See application file for complete search history.

(56) References Cited

U.S. PATENT DOCUMENTS

| | | | |
|---|---|---|---|
| 773,595 A | 11/1904 | Robinson | |
| 778,123 A | 12/1904 | Fetzer | |
| 1,074,763 A * | 10/1913 | Wills | A01B 13/02 |
| | | | 172/507 |
| 1,685,385 A * | 9/1928 | White | A01O 5/068 |
| | | | 111/194 |
| 1,924,626 A | 8/1933 | Roddel | |
| 2,385,668 A * | 9/1945 | White | A01C 7/18 |
| | | | 111/34 |
| 2,454,002 A | 11/1948 | Paluck | |
| 2,571,285 A | 10/1951 | Oehler | |
| 2,667,362 A | 1/1954 | Woodward et al. | |
| 5,269,380 A | 12/1993 | Lofquist et al. | |
| 5,297,497 A | 3/1994 | Schmidt | |
| 5,507,351 A | 4/1996 | Martin | |

(Continued)

FOREIGN PATENT DOCUMENTS

| | | |
|---|---|---|
| DE | 33 17 485 A1 | 11/1984 |
| GB | 1 498 245 | 1/1978 |

OTHER PUBLICATIONS

"Gauge and Press Wheel Scrapers", Schaffert Manufacturing & Sales, May 18, 2015 (4 pages).

(Continued)

*Primary Examiner* — Jamie L McGowan
(74) *Attorney, Agent, or Firm* — Rebecca L. Henkel; Rickard K. DeMille

(57) ABSTRACT

An adjustable scraper structure is attached to a press wheel arm and suspends an adjustable scraper above the press wheel for removing mud buildup above the treads on the tire. The scraper is rotatably adjustable about the rotational axis of the press wheel and the blade pitch is rotatably adjustable about an axis parallel to and removed from the press wheel axis. The pitch or tilt of the scraper blade may be radially aligned with the blade extending perpendicular to a wheel periphery tangent line or the press wheel scraper blade may be inclined somewhat in either direction.

7 Claims, 2 Drawing Sheets

(56) References Cited

U.S. PATENT DOCUMENTS

| | | | |
|---|---|---|---|
| 5,884,711 A | 3/1999 | Shoup | |
| D596,203 S * | 7/2009 | Schaffert | D15/28 |
| 7,631,701 B2 | 12/2009 | Kromminga et al. | |
| 7,730,962 B1 * | 6/2010 | Kester | A01C 5/06 |
| | | | 172/558 |
| 8,104,543 B2 | 1/2012 | Hesla | |
| 8,960,322 B2 | 2/2015 | Kester | |
| 9,113,587 B2 * | 8/2015 | Hesla | A01C 7/203 |
| 2013/0118393 A1 * | 5/2013 | Stark | A01O 5/068 |
| | | | 111/164 |
| 2015/0021058 A1 | 1/2015 | Devloo et al. | |

OTHER PUBLICATIONS

"Mud Scraper for Corn Planters", Farm Show Magazine, vol. 17, Issue 3, p. 23, 1993 (4 pages).
"TP20 Trailing Press Wheel Right Hand Mud Scraper Assembly", Boss Agriculture, May 18, 2015 (1 page).

\* cited by examiner

ADJUSTABLE PRESS WHEEL SCRAPER

BACKGROUND OF THE INVENTION

1. Field of the Invention

The present invention relates to agricultural planters and, more particularly, to a scraper for removing buildup from a planter row unit press wheel.

2. Description of the Related Art

A basic planter has a tractor towed array of row units, each for forming a crop row. The planting process for each row unit includes opening a furrow, depositing seed in that furrow, and closing the furrow. Frequently, there is an additional rearmost assembly on each row unit for pressing or compacting the soil about the seed, for example, with a press wheel, to insure good contact and moisture retention. When a planter is in a soft/muddy field the press wheel tends to buildup with mud causing problems with closing the trench and seed placement. Planting time is wasted if the operator needs to interrupt a planting operation and clean the wheels.

The present invention provides a simplistic yet versatile adjustable soil pressing wheel scraper for removing soil that is moist enough to adhere to the press wheel. A fixed scraper bracket where the scraper is only adjustable along one axis (farther and closer to press wheel) has been suggested. Such an arrangement only determines the proximity to the wheel tread at which the scraper removes the mud. Scrapers which may be variously positioned about the press wheel periphery have also been suggested. Locating the scraper high near the top of the press wheel results in a more widespread dispersion of the removed mud than does a location closer to the ground.

What is needed in the art is a press wheel scraper which may be optimally located and oriented for specific soil conditions.

SUMMARY OF THE INVENTION

The present invention provides a press wheel scraper that is both rotatably and pitch adjustable.

The invention in one form is directed to an agricultural planter row unit with a furrow closing structure located rearward of furrow opening and seed depositing arrangements for moving soil into a furrow to cover the deposited seeds. A soil compacting assembly is located rearward of the furrow closing structure and includes a press wheel support arm extending toward the rear of the row unit with a press wheel having an axle fixed to the support arm. An elongated scraper arm is pivotably fastened near one support arm end for rotation about the press wheel axis of rotation and a scraper blade bracket is pivotably fastened near the other scraper arm end for rotation about an axis displaced from and generally parallel to the press wheel axis of rotation. A scraper blade is fixed to the scraper blade bracket for removing mud from the press wheel periphery. One fastening mechanism secures the scraper arm at a preferred angular orientation relative to the press wheel and another fastening mechanism secures the scraper blade bracket at a preferred angular orientation relative to the scraper arm.

The invention in another form is directed to an adjustment arrangement for determining the angular location and orientation of a scraper relative to the outer periphery of a press wheel. The scraper arm is pivotably supported near one end on the press wheel axle and a fastener fixes the angular position of the scraper arm about the press wheel axis at a selected position. The scraper blade is pivotably attached to the scraper arm near the other scraper arm end for limited rotation relative to the scraper arm and a second fastener for fixes the angular orientation of the scraper blade relative to the scraper arm.

The invention in a further form is directed to an adjustable support assembly for an agricultural planter row unit press wheel scraper. There is a press wheel support arm extending toward the rear of the row unit with a press wheel having an axle fixed to the support arm. The axle determines the press wheel axis of rotation. An elongated scraper arm with scraper blade fixed thereon is pivotably fastened near one scraper arm end for rotation about the press wheel axis of rotation and a scraper blade bracket pivotably fastened near the other scraper arm end for rotation about an axis displaced from and generally parallel to the press wheel axis of rotation. A first fastening mechanism secures the scraper arm at a preferred angular orientation relative to the press wheel, and a second fastening mechanism for secures the scraper blade bracket at a preferred angular orientation relative to the scraper arm.

An advantage of the present invention is pitch or tilt of the scraper blade may be radially aligned (with the blade extending perpendicular to a wheel periphery tangent line) or with the press wheel scraper blade inclined somewhat in either direction Another advantage is it allows planter to get in the field earlier and stay in longer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention in one form, and such exemplification is not to be construed as limiting the scope of the invention in any manner.

DETAILED DESCRIPTION OF THE INVENTION

Figure 1:
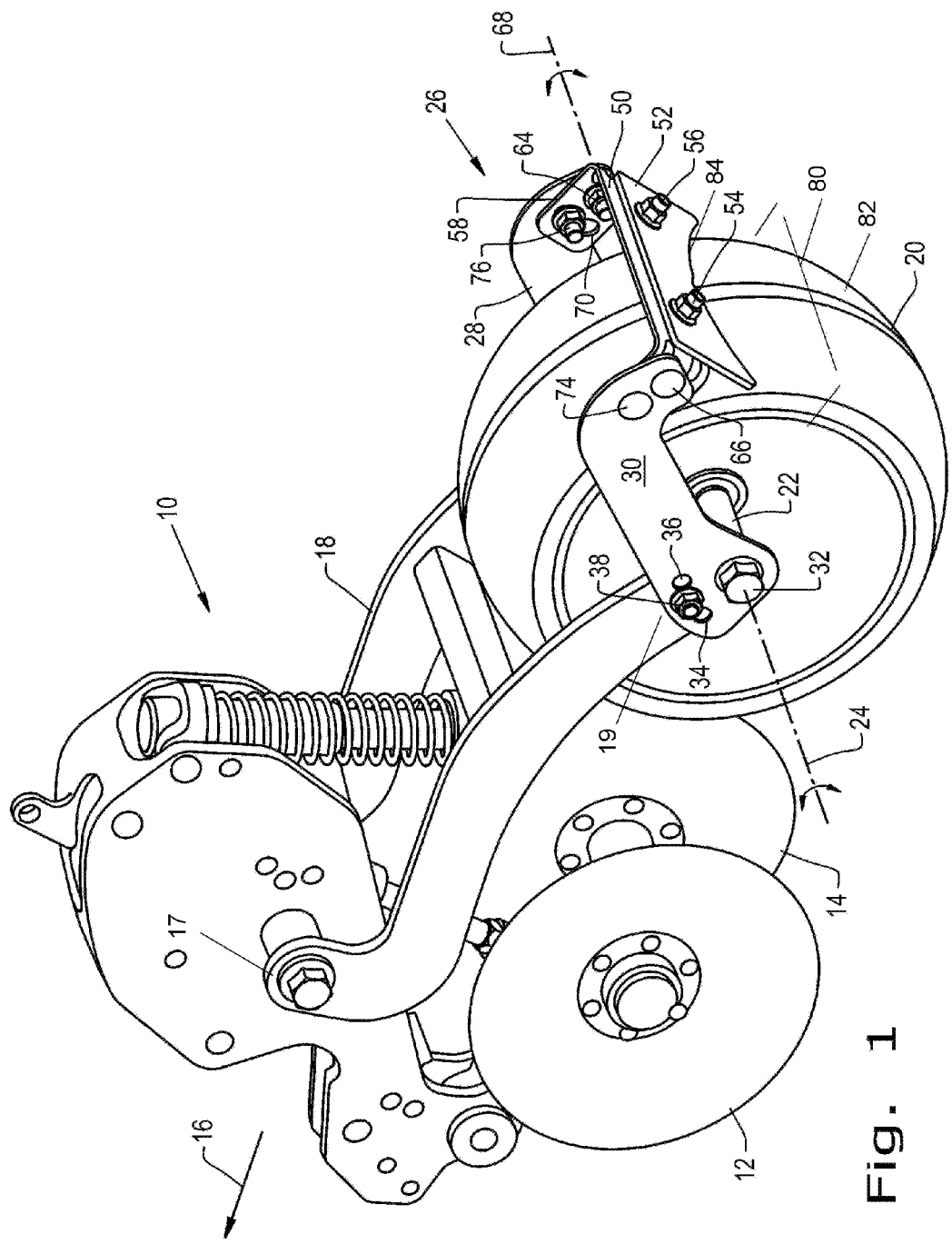
FIG. 1 is an isometric view of a furrow closing and press wheel assembly forming the rearward portion of a planter row unit according to the present invention.

Referring now to the drawings, and more particularly to FIG. 1, there is shown a rearward portion of a planter row unit 10 which generally includes a furrow opening arrangement, a seed depositing mechanism (not shown), and a furrow closing arrangement here shown as a pair of discs 12 and 14. The direction of forward motion of the row unit 10 is indicated by arrow 16. Connected at one end 17 to a portion of the row unit 10 and extending over and rearward of the furrow closing discs 12 and 14 is a press wheel support arm 18 and near the rearward end 19 thereof a press wheel 20 having an axle 22 extending through apertures (not visible) along an axis of rotation 24.

An elongated scraper arm 26 including arm members 28 and 30 spans the press wheel 20. The scraper arm is pivotably attached to the wheel axle 22 for rotation about the axle axis 24, for example by bolt head 32. This rotation allows the scraper blade to be moved about the press wheel periphery while remaining at a constant distance therefrom. A fastening mechanism for securing the scraper arm 26 at a preferred angular orientation relative to the press wheel 20 may take the form of three apertures 34 and 36 equidistant from the axle receiving aperture and corresponding axis 24. A fastening member such as a bolt and nut assembly 38 passes through and obscures the third aperture. Arm member 28 is provided with a similar set of equidistant apertures. Thus, the scraper arm may be angularly adjusted by rotating clockwise or counterclockwise from the position illustrated simply by removing the nut and bolt assemblies from the center apertures and reinserting them in one of apertures such as 34 or 36.

Figure 2:
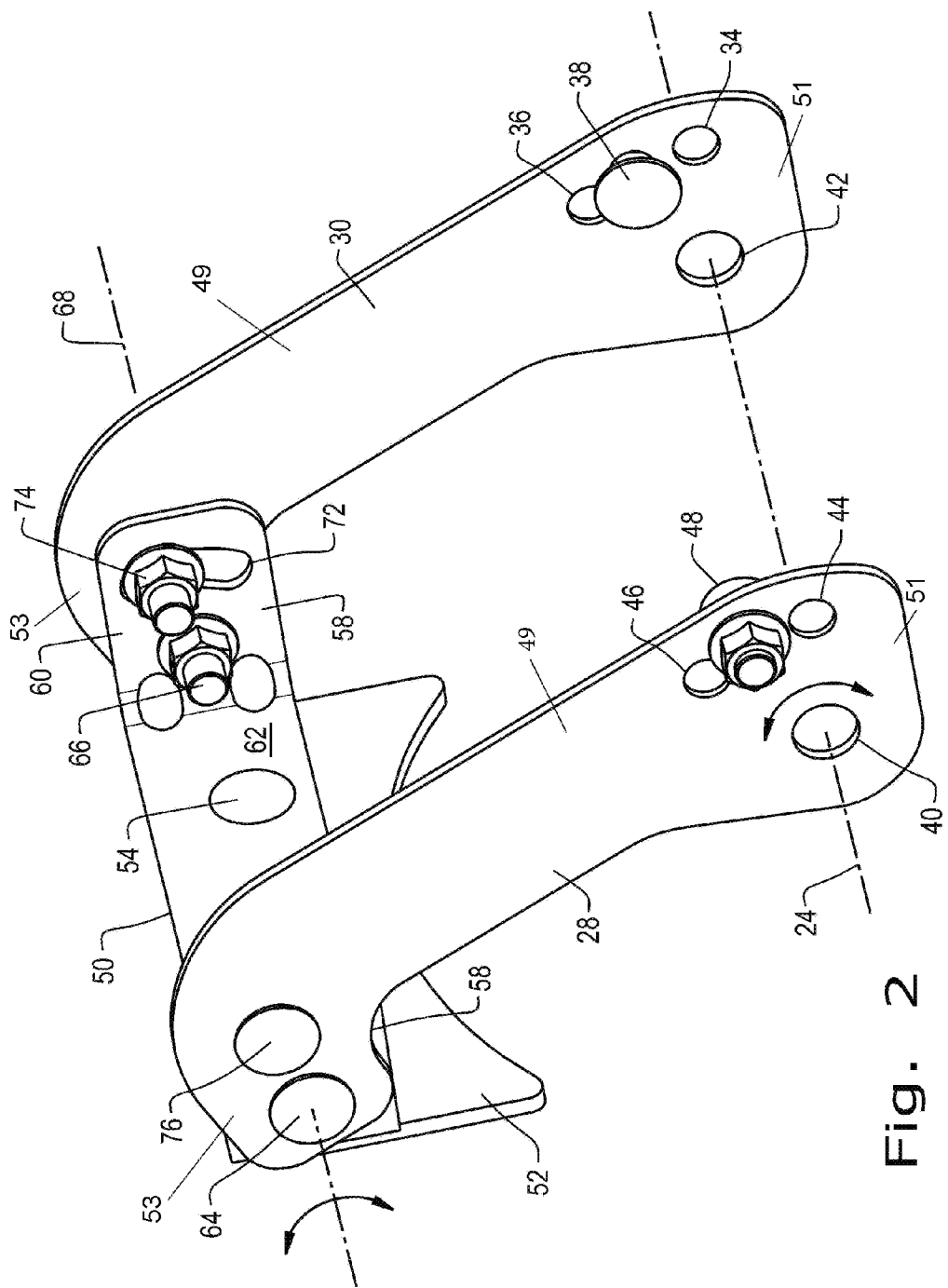
FIG. 2 is an isometric view of the scraper blade and bracket of FIG. 1 showing the surfaces not visible in FIG. 1.

In FIG. 2, bolt head 32 no longer obscures the axle 22 receiving apertures 40 and 42. The angular orientation securing arrangement of the apertures 44 and 46 equidistant from the axle receiving aperture 40 and corresponding axis 24 for the arm member 28 is now visible as is the corresponding bolt and nut assembly 48. The scraper arm members 28, 30 each include an elongate body 49 extending between a fastened end 51 and an opposite end 53 which is curved to provide the opposite end 53 at an angle relative to the elongate body 51. The fastened end 51, the elongate body 49 and the opposite end 53 are formed together in a flat planar alignment.

A scraper blade bracket 50 has the scraper blade 52 fixed thereto by a pair of nut and bold assemblies 54 and 56. The scraper blade bracket 50 is a generally U-shaped member having a pair of arms 58 and 60 extending from an intermediate region 62. Each arm has an aperture for receiving a mounting bolt 64 or 66 which are axially aligned with the blade pitch pivot axis 68, and one arcuate shaped opening 70 or 72. Locking bolts 74 and 76 pass through the arcuate shaped openings and limit the pivotal motion of the blade bracket to the angular extent of the arcuate openings. A firm tightening of the mounting bolts will tend to lock the pitch of the blade 52, however, tightening the locking bolts is much more secure. Press wheel 20 has a width 80 which provides a substantially convex surface 82 across the width 80. The scraper blade 52 provides a cooperating concave surface 84 to position near the convex surface 82 of the press wheel 20 to remove mud from the press wheel 20.

Two somewhat different techniques for fixing the angular relationship between two members have been disclosed. In one, an off-axis aperture in one member is aligned with any selected one of several apertures in the other, and a pin or bolt passed through the aligned openings. In the other, an off-axis aperture in one member is aligned with an arcuate opening in the other and a bolt passed through the aligned openings to clamp the members together. One technique provides a discrete number of possible angular relationships while the other allows a continuous range of possible angular relationships throughout the angular extent of the arcuate opening. Either technique may be employed in lieu of the other and either could be employed for determining the proximity of the blade to the press wheel surface.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An adjustable support assembly for an agricultural planter row unit press wheel scraper, comprising:
   a press wheel support arm extending toward the rear of the row unit;
   a press wheel having an axle fixed to the press wheel support arm and determining the press wheel axis of rotation, the press wheel having a convex surface across a width of an outer periphery of the press wheel;
   a pair of elongated scraper arms, each elongated scraper arm pivotably fastened near one fastened end thereof for rotation about the press wheel axis of rotation, each of the elongated scraper arms including a plurality of apertures positioned at the fastened end and near a separate opening through which the axle is positioned, the elongated scraper arms each including an elongate body extending between the fastened end and an opposite end which is curved to provide the opposite end at an angle relative to the elongate body, the fastened end, the elongate body and the opposite end formed in a flat planar alignment;
   a scraper blade bracket pivotably fastened near an opposite end of each elongated scraper arm for rotation about an axis positioned through the pair of elongated scraper arms and spaced away from and parallel to the press wheel axis of rotation;
   a scraper blade fixed to the scraper blade bracket for removing mud from the press wheel periphery, wherein the scraper blade includes a concave surface which cooperates with the convex surface of the press wheel for removing mud from the press wheel;
   a first fastening -mechanism for fixedly securing the pair of elongate scraper arms in one selected unmovable position by positioning the first fixing mechanism through one aperture of the plurality of apertures on each of the elongated scraper arms at a preferred angular orientation relative to the press wheel, such that the fastened end of each elongate scraper arm is positionable upward and downward in an angular orientation relative to the press wheel, wherein changing a selected position of the pair of elongate scraper arms requires removal of the first fastening mechanism from each elongate scraper arm and selection of another aperture of the plurality of apertures and a re-insertion and fastening the first fastening mechanism into the other aperture of each elongate scraper arm; and
   a second fastening mechanism for securing the scraper blade bracket and the scraper blade carried thereon at an adjustable orientation relative to an angle and a distance of the scraper blade from the press wheel.

2. The adjustable support assembly of claim 1 wherein the plurality of apertures on each elongated scraper arm are equidistant from the opening through which the axle extends, and a corresponding single aperture in the press wheel support arm, wherein each elongated scraper arm is adjustably rotated about the wheel axle opening and the single press wheel arm aperture is brought into alignment with any selected one of the plurality of apertures.

3. The adjustment arrangement of claim 1, wherein each elongated scraper arm has an aperture near the opposite end, and a member passing through the aperture for pivotably supporting the scraper blade bracket.

4. The adjustment arrangement of claim 1, wherein the second fastening mechanism fixes the inclination of the concave surface of the scraper blade relative to the convex surface of the press wheel and comprises an elongated arcuate shaped opening in one of the scraper blade bracket and scraper arm and a corresponding alignable aperture in the other of the scraper blade bracket and scraper arm, and a bolt passing through the arcuate shaped opening and aligned aperture.

5. An agricultural planter row unit, comprising:
   a furrow closing arrangement located rearward of furrow opening and seed depositing arrangements for moving soil into a furrow to cover the deposited seeds including a pair of closing discs; and
   a soil compacting assembly located rearward of the furrow closing arrangement, including:
   a press wheel support arm having one end connected to the row unit and positioned above the closing discs and a rearward end extending toward the rear of the row unit;
   a press wheel having an axle fixed to the rearward end of the press wheel support arm and determining the press wheel axis of rotation, the press wheel having a convex surface across a width of an outer periphery of the press wheel, the press wheel positioned behind and next to the pair of closing discs;
   an elongated scraper arm pivotably fastened near one fastened end thereof for rotation about the press wheel axis of rotation, each of the elongated scraper arms including a plurality of apertures positioned at the fastened end and near a separate opening through which the axle is positioned, the elongated scraper arms each including an elongate body extending between the fastened end and an opposite end which is curved to provide the opposite end at an angle relative to the elongate body, the fastened end, the elongate body and the opposite end formed in a flat planar alignment;
   a scraper blade bracket pivotably fastened near an opposite end of the elongated scraper arm for rotation about an axis positioned through the elongated scraper arm and spaced away from and parallel to the press wheel axis of rotation;
   a scraper blade fixed to the scraper blade bracket for removing mud from the outer periphery of the press wheel, wherein the scraper blade includes a concave surface which cooperates with the convex outer surface of the press wheel for removing mud from the press wheel;
   a first fastening mechanism for fixedly securing the elongated scraper arm in one selected unmovable position by positioning the first fixing mechanism through one aperture of the plurality of apertures on each of the elongated scraper arms at a preferred angular orientation relative to the press wheel, such that the fastened end of the elongate scraper arm is positionable upward and downward in an angular orientation relative to the press wheel, wherein changing a selected position of the pair of elongate scraper arms requires removal of the first fastening mechanism from each elongate scraper arm and selection of another aperture of the plurality of apertures and a re-insertion and fastening the first fastening mechanism into the other aperture of each elongate scraper arm; and
   a second fastening mechanism for securing the scraper blade bracket and the scraper blade carried thereon at an adjustable orientation relative to an angle and a distance of the scraper blade from the press wheel.

6. The row unit of claim 5 wherein the plurality of apertures are equidistant from the press wheel axle, and a corresponding single aperture in the press wheel arm is selectively alignable with any one of the set of apertures.

7. The row unit of claim 5, wherein the second fastening mechanism comprises a single aperture in each elongated scraper arm, a pair of elongated openings in the scraper bracket, and a pair of members each passing through an arm aperture and an elongated opening.

* * * * *